United States Patent Office 3,131,233
Patented Apr. 28, 1964

3,131,233
PURIFICATION OF ACETYLENE
Salem F. Belt, Hitchcock, and Robert J. Evans and Walter H. Stanton, Texas City, Tex., assignors to Monsanto Chemical Company, St. Louis, Mo., a corporation of Delaware
No Drawing. Filed Mar. 21, 1961, Ser. No. 97,145
6 Claims. (Cl. 260—679)

This invention relates to the purification of an acetylene-bearing gas. More particularly, it relates to the removal of higher acetylenes and other polymerizable materials from the acetylene-bearing gas by the use of a solvent and subsequent removal of these compounds from the solvent.

In the manufacture of acetylene from hydrocarbons, by the partial oxidation of natural gas, the resultant acetylene-bearing gas is generally purified by treating it with a selective solvent whereby substantially all of the acetylene, as well as the higher acetylenes, are absorbed while the less soluble components pass off in the off-gas stream. The resultant solution of acetylenes is then treated to separate acetylene from the higher acetylenes and both from the solvent, the solvent then being recycled. Various solvents have been proposed and effectively employed in this purification system. Solvents which have proved to be particularly successful are butyrolactone, dimethylformamide, and N-methylpyrrolidone.

Although this type purification system has been commercially employed, it suffers from one serious disadvantage. Polymer formation occurs in the solvent system because of the presence of higher acetylenes in the acetylene-bearing gas and the use of elevated temperatures in the purification system. Polymers thus formed build up in the solvent and tend to precipitate. Resultant accumulation of polymer solids in the heat exchangers, stripping columns, lines, and the like necessitate periodic shut-downs of equipment, which may seriously limit production. Another disadvantage resulting from the polymer problem is the increased solvent losses as well as the higher maintenance and operating expense. It has been shown that the major factors which determine the amount of polymer formation are the concentration of higher acetylenes in the solvent, temperature, and the residence time of the higher acetylenes.

In order to continuously produce acetylene of the required purity, it is necessary to remove the polymer which has accumulated in the purification system. One suggested method of removing the polymer from the solvent is to treat a continuously withdrawn small slip stream of stripped solvent with water to precipitate polymer which can then be separated by filtration prior to recycling of the solvent. This is not wholly satisfactory because of filtration problems caused by the fine size of the polymer. In addition, the problem of polymer precipitation within the purification system is aggravated because of the possibility of introducing additional water into the solvent. Furthermore, this has the disadvantage of being an expensive operation which contributes substantially to the cost of the acetylene.

Another approach is to stop the formation of polymers in the solvent system before the conditions for polymerization are proper. In this respect, it has been proposed to add any of various chemical agents to the solvent which are believed to be capable of inhibiting polymer formation. This would be particularly advantageous since there has been a continued need for reducing the frequency of shut-down for cleaning necessitated by the accumulation of precipitated polymer. However, none of the chemical inhibitors have been very successful since the continuous feed of monomer into the system from the acetylene-bearing gas requires the continuous feed of inhibitor thus making necessary an inhibitor removal system.

Study of polymer formation in the purification system for acetylenes made from hydrocarbons has indicated that the most effective approach to reducing high maintenance and operating expense is to minimize polymer formation in the solvent system by removing the polymer formers, that is, the higher acetylenes, from the cracked gas before they enter the main circulating solvent system. One means to accomplish this result is to pre-scrub the acetylene-bearing gas with a solvent which will selectively absorb the higher acetylenes from the main acetylene stream. However, the problem of regenerating the solvent makes pre-scrubbing unsatisfactory because the higher acetylenes have very high solubilities and are therefore extremely difficult to remove. Thus, some of the dissolved polymer formers recycle in the main circulating solvent system until they polymerize which requires removal via a polymer removal system at considerable expense. So, a method to desorb the higher acetylenes from the pre-scrub solvent system would result in a considerable saving in solvent cost as well as lower maintenance and operating expense because subsequent polymer formation in the solvent system would be eliminated.

It is, therefore, the object of this invention to remove the higher acetylenes from the pre-scrub solvent system. A further object of this invention is to hydrogenate the higher acetylenes to form more easily desorbed and non-polymerizable alkenes and alkanes. Still another object of the invention is to hydrogenate the higher acetylenes to the easily desorbed alkenes and alkanes by the selective catalytic action of palladium and other highly selective catalysts. A final object of this invention is to produce by-product butadiene which can be recovered from the selective hydrogenation of higher acetylenes as a useful by-product. These and other objects of the invention will become apparent from the following description.

According to this invention, monovinylacetylene, biacetylene, and other higher acetylenes are selectively absorbed by a solvent from the acetylene-bearing gas stream, hydrogenated by the action of metallic hydrogenation catalysts to butadiene, alkenes and alkanes and removed from the solvent system.

The following examples describe the way in which the invention has been practiced and illustrates certain of its advantages. However, they are not to be construed as limiting the invention.

EXAMPLE I

The hydrogenation of monovinylacetylene and biacetylene in an N-methylpyrrolidone solvent was carried out in ordinary low pressure laboratory equipment consisting essentially of three 300 ml. containers consisting of a feed tank, a reaction vessel, and a receiver, one mounted above the other. The reaction vessel was packed with 200 g. of 0.025 percent palladium on ⅛ inch alumina pellets. The N-methylpyrrolidone solution containing monovinylacetylene and biacetylene was placed in the feed tank and allowed to flow over the catalyst in the reaction vessel, the hydrogenated solution being collected in the receiver. A hydrogen pressure of 50 p.s.i.g. was maintained at the top of the feed tank and at the bottom of the reaction vessel at all times. The solution was fed at a rate of approximately 500 g. per hour. A constant temperature of 66° C. was set during the entire run. The mole percent of biacetylene, monovinylacetylene, butadiene, butenes, and butane in the N-methylpyrrolidone solvent before hydrogenation and after hydrogenation are shown in Table I. The butadiene, butenes, and butane were separated from the solvent by stripping or simple distillation at atmospheric pressure.

EXAMPLE II

The experiment of Example I was repeated using a flow rate of approximately 400 g. per hour and a temperature of 46° C. The results of this hydrogenation reaction are also indicated in Table I.

EXAMPLE III

The experiment of Example I was repeated using a flow rate of approximately 650 g. per hour and a temperature of 55° C. These results are also tabulated in Table I.

EXAMPLE IV

The experiment of Example I was repeated using a flow rate of approximately 550 g. per hour and a temperature of 65° C. These results are shown in Table I, as well as those from the other runs, for comparative purposes.

The invention can be further illustrated in examples wherein butyrolactone solvent is substituted for N-methylpyrrolidone solvent in the above examples. In a like manner the invention can also be illustrated in examples wherein platinum and Raney nickel are each substituted for the palladium catalyst on alumina pellets in the above examples.

It is apparent from the above examples that biacetylene and monovinylacetylene can be hydrogenated in the N-methylpyrrolidone solvent with which they have been removed from the acetylene-bearing gas stream. It is likewise apparent from these examples that butadiene, butenes, and butane are produced by this hydrogenation reaction and will thus allow the purification of the N-methylpyrrolidone solvent to be accomplished by a simplified stripping of these compounds from the solvent.

The particular advantages of the present invention are the ease with which the hydrogenated products of biacetylene and monovinylacetylene are manufactured, the non-polymerizable nature of the hydrogenated products, and the simplicity with which they can be removed by stripping from the solvent in comparison with the extreme difficulty encountered in removing biacetylene and monovinylacetylene from the N-methylpyrrolidone solvent. By the utilization of this invention, solvent losses of N-methylpyrrolidone are reduced substantially and the higher acetylene polymer problem is reduced to an insignificant level thus increasing the production of acetylene and decreasing the over-all expense in producing it.

Any higher acetylene, including biacetylene and monovinylacetylene, and other polymerizable materials which are manufactured in the cracking of hydrocarbons to form acetylene, will be absorbed by N-methylpyrrolidone solvent and can be hydrogenated by the method of this invention so that their removal by stripping can be accomplished with considerable ease. Other acetylene solvents which are used commonly in the purification of acetylene can be employed in the practice of this invention.

The hydrogenation reaction may be carried out at any reasonably low temperature. The applicable range to accomplish the desired results is from about 25° C. to about 200° C. However, for ease of operation, the range of from about 25° C. to about 100° C. is preferred. The hydrogen pressure that must be maintained on the system to accomplish the proper hydrogenation varies from atmospheric to about 100 p.s.i.g. However, a pressure in the range from about 25 p.s.i.g. to about 50 p.s.i.g. is preferred because of the simplicity of operation and the lack of need for high pressure equipment.

Any catalyst such as palladium, platinum, rhodium, ruthenium, nickel, or other group VIII metal supported on the external surfaces of alumina or silica pellets will successfully hydrogenate the biacetylene, monovinylacetylene, and other higher acetylenes in this invention. Other catalysts which are known to be successful are Raney iron, Raney nickel, and platinum black.

*Table I*

[Mole percent]

| Compound | Feed Solution | Examples | | | |
|---|---|---|---|---|---|
| | | I | II | III | IV |
| Biacetylene ($C_4H_4$) | 0.55 | 0.13 | 0.17 | 0.12 | 0.08 |
| Monovinylacetylene ($C_4H_4$) | 0.11 | 0.03 | 0.03 | 0.03 | 0.01 |
| Butadiene ($C_4H_6$) | 0.05 | 0.24 | 0.14 | 0.13 | 0.13 |
| Butenes ($C_4H_8$) | 0.09 | 0.69 | 0.27 | 0.35 | 0.29 |
| Butane ($C_4H_{10}$) | 0.25 | 1.25 | 0.47 | 0.70 | 0.58 |

What is claimed is:

1. In a process for the purification of acetylene wherein the higher acetylenes are removed from the main acetylene bearing gas stream by the selective action of a solvent, the improvement which comprises hydrogenating the higher acetylenes in the higher acetylenes-solvent mixture by the catalytic action of a metallic hydrogenation catalyst and removing the hydrogenated product from the solvent.

2. The process as described in claim 1 wherein the hydrogenated product is a non-polymerizable material.

3. The process as described in claim 2 wherein the hydrogenation catalyst is one selected from the group consisting of palladium, platinum, rhodium, ruthenium, nickel, Raney iron, Raney nickel and platinum black and the catalyst support is chosen from the group consisting of alumina and silica.

4. The process as described in claim 3 wherein the solvent is chosen from the group consisting of butyrolactone and N-methylpyrrolidone.

5. The process as described in claim 4 wherein the hydrogenation temperature is in the range from about 25° C. to about 200° C. and the hydrogen pressure maintained in the reaction vessel is from atmospheric to about 100 p.s.i.g.

6. In a process for the purification of acetylene wherein higher acetylenes are removed from the main acetylene-bearing gas stream by the selective action of N-methylpyrrolidone solvent, the improvement which comprises hydrogenating the higher acetylenes in the higher acetylenes-solvent mixture by the catalytic action of palladium on alumina at a temperature from about 25° C. to about 100° C. and a pressure from about 25 p.s.i.g. to about 50 p.s.i.g. and removing the formed butadiene, butenes, and butanes thus produced by stripping in a distillation column.

References Cited in the file of this patent

UNITED STATES PATENTS

| | | |
|---|---|---|
| 2,891,633 | Morro et al. | June 23, 1959 |
| 2,909,578 | Anderson et al. | Oct. 20, 1959 |
| 2,915,138 | Sarabia | Dec. 1, 1959 |
| 3,003,008 | Fleming et al. | Oct. 3, 1961 |